Nov. 11, 1969  G. L. HERVERT  3,477,210
HYDROCARBON VAPOR CONTROL MEANS FOR USE
WITH ENGINE CARBURETOR
Original Filed Sept. 18, 1967

Porous Felt or Paper
With Absorbent Material

INVENTOR:
George L. Hervert
BY:
*James R. Hoatson, Jr.*
*Philip T. Liggett*
ATTORNEYS United States Patent Office 3,477,210
Patented Nov. 11, 1969

3,477,210
HYDROCARBON VAPOR CONTROL MEANS FOR USE WITH ENGINE CARBURETOR
George L. Hervert, Downers Grove, Ill., assignor to Universal Oil Products Company, Des Plaines, Ill., a corporation of Delaware
Continuation of application Ser. No. 668,356, Sept. 18, 1967. This application Aug. 12, 1968, Ser. No. 754,099
Int. Cl. B01d 53/04, 53/14, 53/16
U.S. Cl. 55—387                                    4 Claims

ABSTRACT OF THE DISCLOSURE

The use of a combined hydrocarbon sorbent-air filter element in combination with the inlet section of a carburetor for an internal combustion engine provides a convenient means for trapping hydrocarbon vapors so that they are not released to the atmosphere. The combined sorbent-filtering element itself will comprise a fibrous matrix in the nature of a mat or a filtering paper or felt that may be manufactured or fabricated of a suitable natural or synthetic material and incorporating a hydrocarbon sorbent material such as activated carbon particles.

SPECIFICATION

This application is a continuation of application Ser. No. 668,356, filed Sept. 18, 1967 and now abandoned, which in turn is a continuation-in-part of previously filed application Ser. No. 452,663, filed May 3, 1965, now U.S. Patent No. 3,368,326.

This invention relates to means for effecting the sorption of hydrocarbon vapors in connection with an internal combustion engine carburetor, so that "hot-soak" vapors will be precluded from reaching the atmosphere. More specifically, there is provided a combined sorbent-filter element for use within an air intake portion of the carburetor, so that such element is in a position to sorb "hot-soak" gasoline vapors for the periods of time that an engine is idling or has been turned off. Desorption of vapors in the element will, in turn, be effected by an incoming air stream flowing to the carburetor during high engine speed periods.

In order to obtain the proper gasoline flow to a carburetor mixing section from its float bowl, there is provided suitable vent means from such bowl so as to maintain atmospheric pressure therein. There may be an "external vent system" or an "internal vent system." In the latter, there is a direct line or passageway from the top of the float bowl to the air intake portion of the carburetor at a point upstream from the venturi mixing section thereof.

In addition to normal or low temperature fuel losses from a carburetor, there is a condition termed "hot-soak loss" which relates to the evaporation losses of gasoline occurring from the carburetor after an engine is stopped or comes to an idle after a high speed operation. Such losses may be quite appreciable, particularly in hot weather periods. Actually, it is believed that carburetor and fuel tank evaporation losses may amount to some 20% or more of the total hydrocrabons emitted from cars into the atmosphere for the Los Angeles area.

SUMMARY OF THE INVENTION

It may be consideretd a principal object of the present invention to provide an improved hydrocarbon sorbent-air filter unit for use with a carburetor to prevent "hot-soak" fuel losses.

It may also be considered an object of the present invention to provide an improved form of sorbent-air filter element for the air inlet section of a carburetor system which incorporates a sorbent material by uniform distribution into a suitable porous filter media.

A still further object of this invention is to provide an element which is in a form which may be readily inserted or replaced within a carburetor air intake system for easy maintenance purposes or to provide for replacement of non-sorbent type air filter elements.

Broadly, the present invention embodies a combined sorbent-filter unit for use with the air intake section of a carburetor for an internal combustion engine to effect the trapping of vapors that may evaporate from the fuel system, which unit comprises, an air penetrable porous filter media containing a uniform distribution of hydrocarbon sorbent material.

It is not intended to limit the invention relating to the combined material to any one size or shape or even to say one combination of materials. For example, the unit will normally take the shape of a hollow cylindrical section or be dough-nut shaped adapted to set into the air intake housing of a carburetor, such as the type presently used in the automotive field. However, the combined sorbent-filter unit may have a flat disc-like form adapted to merely be positioned transversely across an air intake passageway upstream from any internal vent means in the carburetor and from the venturi mixing throat section thereof. Thus, the unit is available to receive the rising evaporated hydrocarbon vapors during an engine idle or for the hot soak period following an extended high speed engine operation; while, at the same time, such unit is in a position to be in the path of the incoming air stream flowing to the carburetor mixing zone for a subsequent high speed engine operation whereby such incoming air will effect the desorption of the entrapped vapors from the sorbent material.

There are various commonly used air filtering media for carburetor air intake sections, such as various metallic and fibrous mats, corrugated porous papers or fibrous matrix materials formed of natural cellulosic pulp, open cell polyurethane foam materials, etc. The hydrocarbon sorbent material, in turn, may comprise activated carbon, molecular sieves, silica gel, fuller's earth, alumina, charcoal (especially that made from suitable nut shells or peach pits), etc. The sorbent material, normally supplied as finely divided particles, may be milled into or otherwise uniformly distributed throughout the entire air filtering media so that there will be a resulting efficient entrapment of any rising fuel vapors into the combined unit. In the mat type of filter media, the sorbent particulates will generally be physically distributed in a uniform manner throughout the entire mat to result in the combined sorbent-filter unit. On the other hand, in a porous fibrous type matrix being formed of pulp like materials or of cohering fibers such as from straw, jute, flax, asbestos, cotton or other rag stock material, and the like, there will be a uniform distribution of the sorbent material into the filter media during the forming and fabrication of the resulting filter element such that all of the sorbent particulates are uniformly disposed throughout the entire mass of the combined unit. There, of course, shall be a sufficient amount of hydrocarbon sorbent present within the combined sorbent-filter element so as to trap all of the hydrocarbon vapors that may be released from the carburetor system, which quantity may be sufficient to absorb of the order of some 15 grams of condensed fuel vapor. Also, where the sorbent-filter element is to receive hydrocarbon vapors from both the carburetor system and a gasoline tank vent line, then the quantity of sorbent shall be sufficient to accommodate a still greater amount of condensed hydrocarbon vapors.

Another type of combined sorbent-filter unit may be formed of synthetic fibrous or filament materials such as are obtained from the matting or adhering of spun nylon, glass wool, fiber glass, etc. In still another instance, there may be utilized thermal setting plastic material or fibers in combination with filaments or with natural fibrous materials in order to produce a resulting rigid porous hydrocarbon sorbent-filter element. For example, phenolic materials, polyesters, epoxy and alkyd plastic fibers are typical of the materials which may be combined with the aforedescribed cellulosic fibrous materials or with felt and fabric type of fibers so as to provide a rigid element following heating and setting steps.

In all cases there shall be a plurality of random portions of fibrous or filamentary structures within the filter materials to provide suitable overlap and holding of carbon particles, or other sorbent particulate materials, so that there is a resulting porous three dimensional structure capable of being readily inserted into a suitable air intake housing for a carburetor system.

DESCRIPTION OF THE DRAWING

Reference to the accompanying drawing and the following description thereof will serve to better describe the present invention and point out additional advantageous features in connection therewith.

Figure 1:
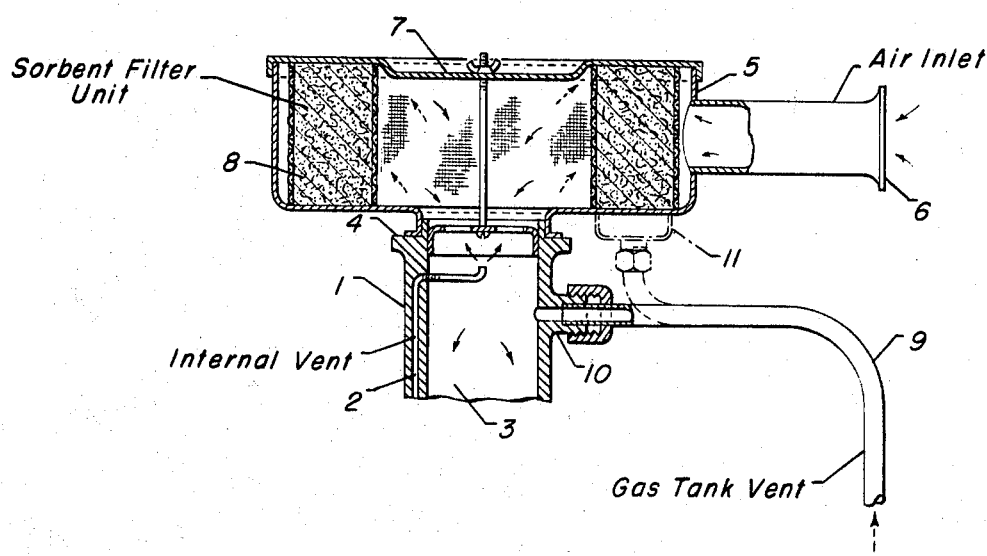
FIGURE 1 of the drawing is a diagrammatic sectional view through the upper portion of a carburetor system utilizing a combined sorbent-filter element in the air intake portion of the system.

Referring now particularly to FIGURE 1 of the drawing there is indicated the upper portion of a carburetor unit 1 having, in this embodiment, an internal vent passageway 2 adapted to return hydrocarbon vapors from a float bowl section (not shown) to the upper internal air intake passageway 3. Attached to an upper flange means 4 is a suitable filter housing 5 having an air intake opening 6 and a removable cover means 7. The interior of the housing 5 is, in this instance, adapted to contain a large hollow cylinder form of sorbent-filter unit 8. Although particulates cannot be readily shown in a drawing, it is to be understood that unit 8 contains an adequate distributed quantity of sorbent particles in the filter media.

The element 8 within the housing 5 is of course positioned to block the entire air path between the air inlet means 6 and the carburetor air intake passageway 3 whereby all fuel vapors during an idle or a hot soak period will be entrapped without a chance of bypassing directly to the atmosphere. At the same time, with the full blockage of the air inlet passageway, there is the provision for the desorption of the entire sorbent-filter element 8 during all periods of normal cruising or high speed engine operation. Of course, as hereinbefore set forth, the combined unit 8 will be fabricated of a suitable porous fibrous material, open cell foam material, matted filaments, etc. with a uniformly distributed quantity of sorbent particulates so as to insure the entrapment of all hydrocarbon vapors which will carry to the unit during the "idle" or "off" periods for the engine.

The present embodiment of FIGURE 1 also indicates a fuel tank vent line 9 carrying to inlet means 10 at the side of the carburetor air intake section such that evaporated fuel from the automobile gasoline tank will be channeled to the combined sorbent-filter unit. As an alternative arrangement, the vent line 9 may carry directly to a vapor distributing section 11 shown in dashed lines in the drawing which section may be provided as part of the air intake housing 5 in a position to distribute vapors into contact with the sorbent-filter unit. In other words, the vapors will not have a chance to become directly vented to the atmosphere without having passed through the sorbent unit. Although not shown in the drawing, the vent line 9 may have suitable orifice means and/or flame arrester as a safety protection between the fuel tank and the carburetor or engine zone. Still further, as hereinbefore noted, when accommodating additional fuel vapors, it is desirable to have an enlarged combined sorbent-filter unit so as to readily accommodate the added quantity of condensable vapors.

Figure 2:
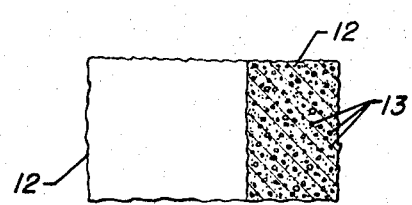
FIGURE 2 of the drawing indicates diagrammatically a foam like filter media with distributed sorbent particulates in order to provide a combined sorbent-filter element.

Referring now to FIGURE 2 of the drawing, there is shown a partial sectional view through an open-cell foam type of material, such as polyurethane foam 12 with a uniform distribution of particulates 13 of activated carbon or other suitable sorbent media. The sorbent may be uniformly milled into the foam prior to its setting or shaping in a fabrication step. In this instance the formed element 12 is shown in a hollow cylindrical shape such as unit 8 in FIGURE 1 of the drawing; however, other suitable shapes may of course be utilized as long as the shape of the combined sorbent-filter element will in all cases, as hereinbefore noted, be such as to completely block an air passageway means into the air intake section of the carburetor unit. A combined unit such as shown in FIGURE 2 may be soft and compressible or may be formed of a rigid porous media fabricated into a desired preformed shape. The rigidity may be provided by the use of a suitable thermal setting material coated onto or otherwise distributed within a normally resilient fibrous matrix or filament mat in turn having a uniform distribution of sorbent particulates.

Figure 3:
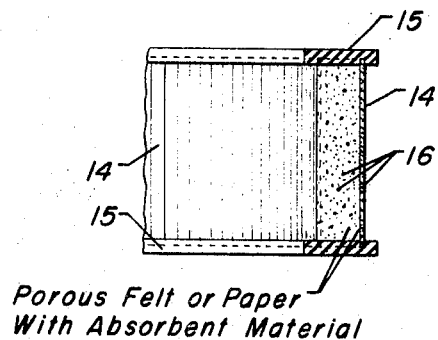
FIGURE 3 indicates diagrammatically a partial sectional view of the utilization of a pleated fibrous air filter element containing distributed sorbent particulates therein.

In FIGURE 3 of the drawing, a pleated form of porous matrix comprising a paper-like material or felt-like material is held in the form of a pleated cylinder 14 having the upper and lower ends held between rigid retainer rings 15. The latter may be formed of rubber, plastic, or other suitable substantially rigid material which may be formed to hold the edges of the pleated large surface element 14 in a cylindrical form for subsequent placement within a typical air intake housing for a carburetor system. The pleated arrangement for the porous felt or paper-like material 14 will, of course, provide a large surface area and in turn be capable of holding a larger quantity of sorbent material within the filter media and accommodate the desired vapor sorbing function during idle and hot-soak periods following higher speed engine operations. Again, although not easily shown in the drawing, the filter media 14 will have a uniform distribution, both internally and externally, of suitable hydrocarbon sorbent particulates 16 so as to provide for the vapor sorption of the carburetor system.

It is, of course, not intended to limit the present invention to the use of combined sorbent-filter units of only the shapes or configurations shown in the accompanying drawing, or heretofore described, inasmuch as other shapes and constructions will be obvious to one skilled in the art. Actually, a particular unit configuration will be dictated or required by engine designers and space availability for an air intake section to a carburetor system in the engine compartment of an automobile or other vehicle. However, in all cases, the particular sorbent material shall be in a finely divided form and shall be uniformly distributed into the filter media in an amount sufficient to accommodate the hydrocarbon vapors which will be present under the temperature conditions which may be encountered, as for example, at the "under-hood" temperatures of an automobile after high speed operations in summer time conditions.

Although not shown in the drawing, the improved sorbent-filter type unit may be used in canister means, or the like, which connects with the external vent means from an external vent type of carburetor system.

I claim as my invention:

1. In combination with the air-intake section of a carburetor for an internal combustion engine, a combined hydrocarbon vapor sorbent-filter unit adapted to trap hydrocarbon vapors that evaporate from the fuel system for said engine, which unit comprises an air penetrable porous structure defined by a matrix formed of open cell foamed plastic material said matrix containing finely divided hydrocarbon vapor sorbent material uniformly distributed throughout the matrix, and said unit being constructed and arranged to block the entire air path into said air-intake section.

2. The sorbent-filter unit of claim 1 further characterized in that such unit is of a hollow cylindrical form adapted to be placed upstream from any vent means from said carburetor and downstream from the air inlet means thereto.

3. The sorbent-filter unit of claim 1 further characterized in that such unit is of a flat form adapted to be positioned across an air passageway upstream from any vent means from said carburetor downstream from the air inlet means thereto.

4. The sorbent-filter unit of claim 1 further characterized in that the porous filter media is a polyurethane in turn formed into an air permeable matrix.

References Cited

UNITED STATES PATENTS

| 2,925,879 | 2/1960 | Costa et al. | 55—387 |
| 3,015,367 | 1/1962 | Smith et al. | 55—387 |
| 3,082,481 | 3/1963 | Hinde et al. | 55—387 X |
| 3,115,873 | 12/1963 | Hahn et al. | 123—119 |
| 3,191,587 | 6/1965 | Hall | 123—136 |
| 3,221,724 | 12/1965 | Wentworth | 261—73 X |

REUBEN FRIEDMAN, Primary Examiner

JOHN ADEE, Assistant Examiner

U.S. Cl. X.R.

123—119